US012385548B2

(12) United States Patent
Kuebler et al.

(10) Patent No.: US 12,385,548 B2
(45) Date of Patent: Aug. 12, 2025

(54) FREQUENCY DAMPENING MOUNTING SYSTEM

(71) Applicant: Vibracoustic USA, Inc., South Haven, MI (US)

(72) Inventors: Marc D. Kuebler, Allegan, MI (US); Mateus Jose Marcon Gomes, St. Joseph, MI (US); Salil Milind Garde, Hudsonville, MI (US)

(73) Assignee: Vibracoustic USA, Inc., Farmington Hills, MI (US)

( * ) Notice: Subject to any disclaimer, the term of this patent is extended or adjusted under 35 U.S.C. 154(b) by 467 days.

(21) Appl. No.: 17/867,041

(22) Filed: Jul. 18, 2022

(65) Prior Publication Data
US 2023/0031696 A1    Feb. 2, 2023

Related U.S. Application Data

(60) Provisional application No. 63/226,927, filed on Jul. 29, 2021.

(51) Int. Cl.
*F16F 15/08* (2006.01)
*F04B 53/00* (2006.01)

(52) U.S. Cl.
CPC .......... *F16F 15/085* (2013.01); *F04B 53/003* (2013.01); *F16F 2224/025* (2013.01); *F16F 2226/045* (2013.01); *F16F 2230/0005* (2013.01)

(58) Field of Classification Search
CPC .. F16F 1/024; F16F 3/12; F16F 15/085; F16F 2224/025; F16F 2226/045; F16F 2230/0005; F04B 53/00; B61F 5/125
(Continued)

(56) References Cited

U.S. PATENT DOCUMENTS 3,809,427 A * 5/1974 Bennett ............... B60G 99/004
                                                                 29/512
4,641,732 A * 2/1987 Andry .................... F16F 7/108
                                                                 188/379
(Continued)

FOREIGN PATENT DOCUMENTS

DE      29508957 U1    11/1995
DE      10104936 A1    9/2002
(Continued)

OTHER PUBLICATIONS

English machined translation of description, DE-10104936-A1, Sep. 12, 2002.*
(Continued)

*Primary Examiner* — Robert A. Siconolfi
*Assistant Examiner* — San M Aung
(74) *Attorney, Agent, or Firm* — Dickinson Wright PLLC

(57) ABSTRACT

A vibration isolating damper for securing a first structure to a second structure includes a primary isolator of elastomeric material configured to engage the first structure for securement thereto and including a tubular body and a shoulder adjacent to an axial end of the tubular body, the shoulder extending radially inwardly to partially close the axial end of the tubular body. The vibration isolating damper also includes a fastener having a rod portion extending through the tubular body of the primary isolator and configured for securement to the second structure; a rigid tube disposed about the rod portion of the fastener and extending through the tubular body of the primary isolator; and a coil spring disposed about the rigid tube and engaging the shoulder of the primary isolator within the tubular body.

20 Claims, 5 Drawing Sheets

(58) Field of Classification Search
USPC .......................................................... 188/379
See application file for complete search history.

(56) References Cited

U.S. PATENT DOCUMENTS

| | | | | |
|---|---|---|---|---|
| 4,921,203 A | * | 5/1990 | Peterson ................ | B62D 27/04 |
| | | | | 267/141.1 |
| 2005/0133325 A1 | * | 6/2005 | Kuwayama ............. | F16F 7/108 |
| | | | | 188/379 |
| 2006/0244188 A1 | * | 11/2006 | Johnson ................ | F16F 1/3735 |
| | | | | 267/293 |

FOREIGN PATENT DOCUMENTS

| | | |
|---|---|---|
| EP | 1369614 A1 | 12/2003 |
| EP | 3063428 A1 | 9/2016 |
| GB | 1281690 A | 7/1972 |
| WO | 2015062680 A1 | 7/2015 |

OTHER PUBLICATIONS

Extended European Search Report regarding corresponding EP App. No. 22187874.7; issued Nov. 29, 2022.

* cited by examiner

FREQUENCY DAMPENING MOUNTING SYSTEM

CROSS REFERENCE TO RELATED APPLICATION

This patent application claims the benefit of priority to U.S. Provisional Patent Application Ser. No. 63/226,927, filed Jul. 29, 2021, the entire disclosure of which is incorporated by reference herein in its entirety.

FIELD OF THE INVENTION

The present disclosure relates to a frequency dampening mounting system for vehicle systems and assemblies.

BACKGROUND

Vehicle systems, assemblies and components result in noise and vibration during operation of the vehicle. Efforts to mitigate noise and vibration include frequency dampening and resonant frequency avoidance. The industry utilizes many different types of dampening components and techniques, the selection of which depends on the particular application. Efforts to improve dampening are continuously sought in the industry, as noise and vibration not only lead to more rapid and severe degradation of components, but are also associated with a negative perception of vehicle quality by consumers.

SUMMARY

According to one aspect of the disclosure, a vibration isolating damper for securing a first structure to a second structure is provided. The vibration isolating damper includes a primary isolator of elastomeric material configured to engage the first structure for securement thereto and including a tubular body and a shoulder adjacent to an axial end of the tubular body, the shoulder extending radially inwardly to partially close the axial end of the tubular body. The vibration isolating damper also includes a fastener having a rod portion extending through the tubular body of the primary isolator and configured for securement to the second structure; a rigid tube disposed about the rod portion of the fastener and extending through the tubular body of the primary isolator; and a coil spring disposed about the rigid tube and engaging the shoulder of the primary isolator within the tubular body.

According to another aspect of the disclosure, a mounting bracket assembly for attaching a component to a structural element in a vehicle is provided. The mounting bracket assembly includes at least one vibration isolating damper configured to couple the component to the structural element while limiting transmission of vibration therebetween. The vibration isolating damper includes a primary isolator of elastomeric material configured to engage a first structure for securement thereto and including a tubular body and a shoulder adjacent to an axial end of the tubular body, the shoulder extending radially inwardly to partially close the axial end of the tubular body. The vibration isolating damper also includes a fastener having a rod portion extending through the tubular body of the primary isolator and configured for securement to the second structure; a rigid tube disposed about the rod portion of the fastener and extending through the tubular body of the primary isolator; and a coil spring disposed about the rigid tube and engaging the shoulder of the primary isolator within the tubular body.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various embodiments of the invention are illustrated and disclosed herein.

Figure 1A:
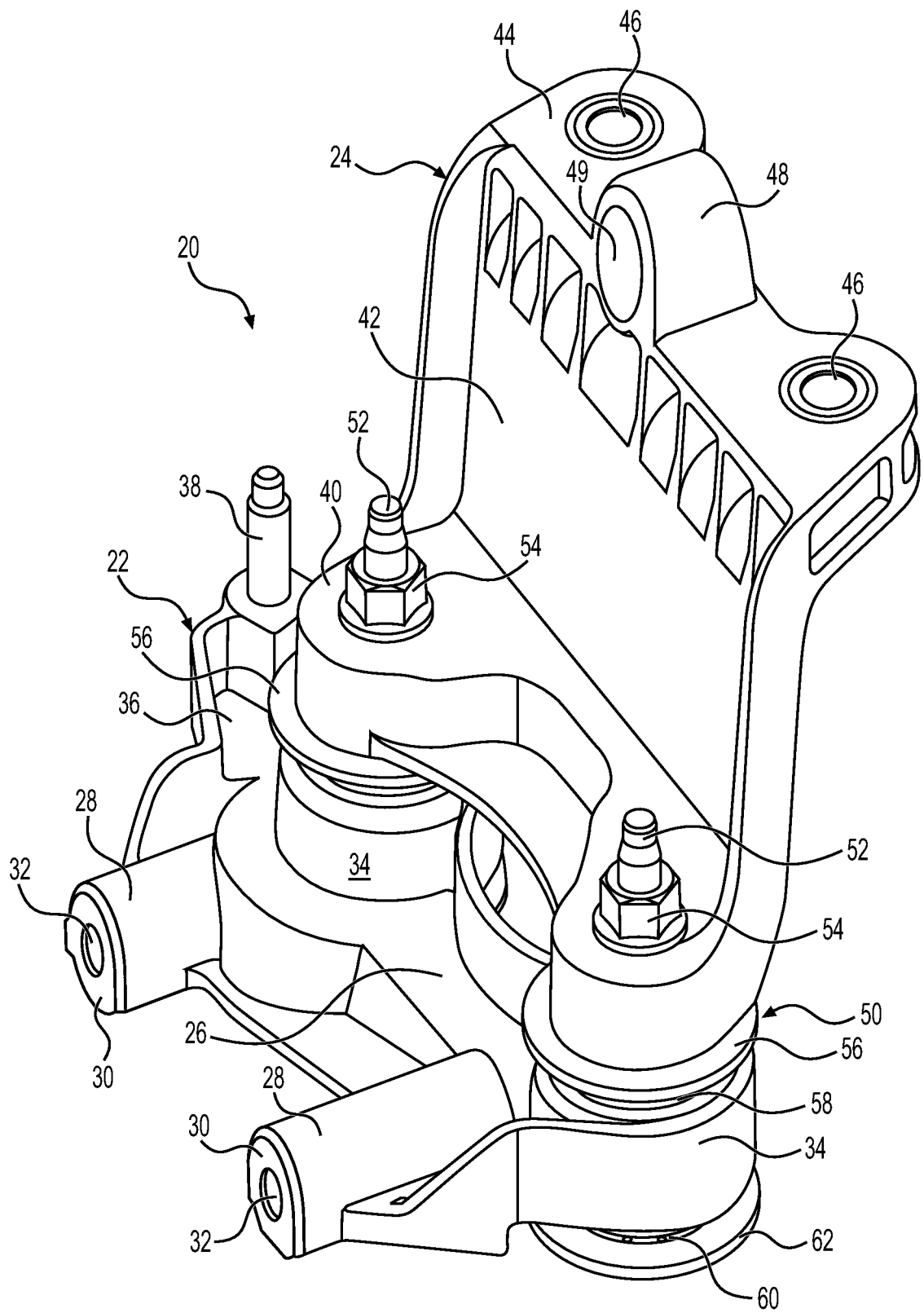
FIG. 1A shows a perspective view of a mounting bracket assembly in accordance with an aspect of the present disclosure.
Figure 1B:
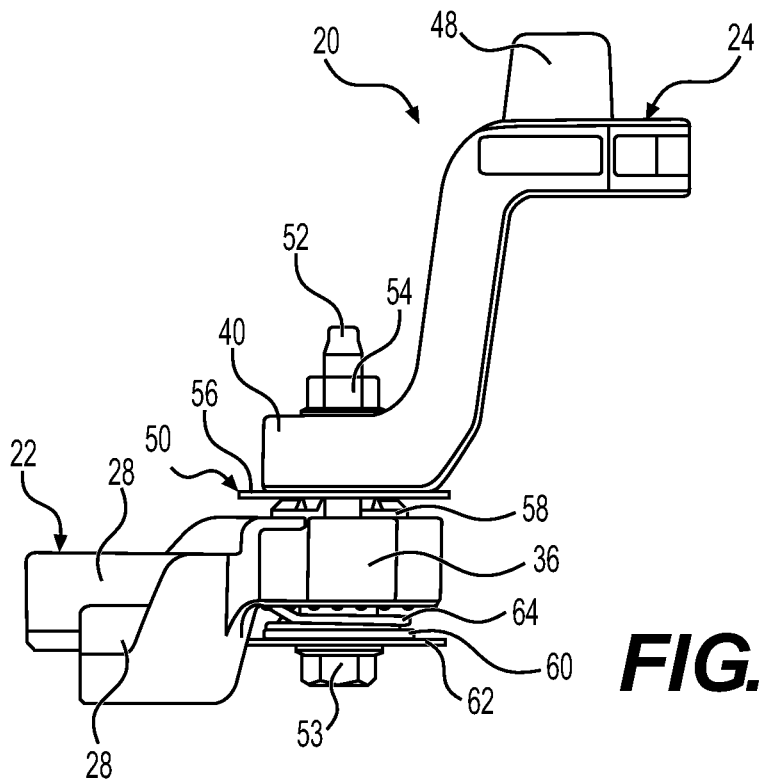
FIG. 1B shows an end view of the mounting bracket assembly of FIG. 1A.
Figure 1C:
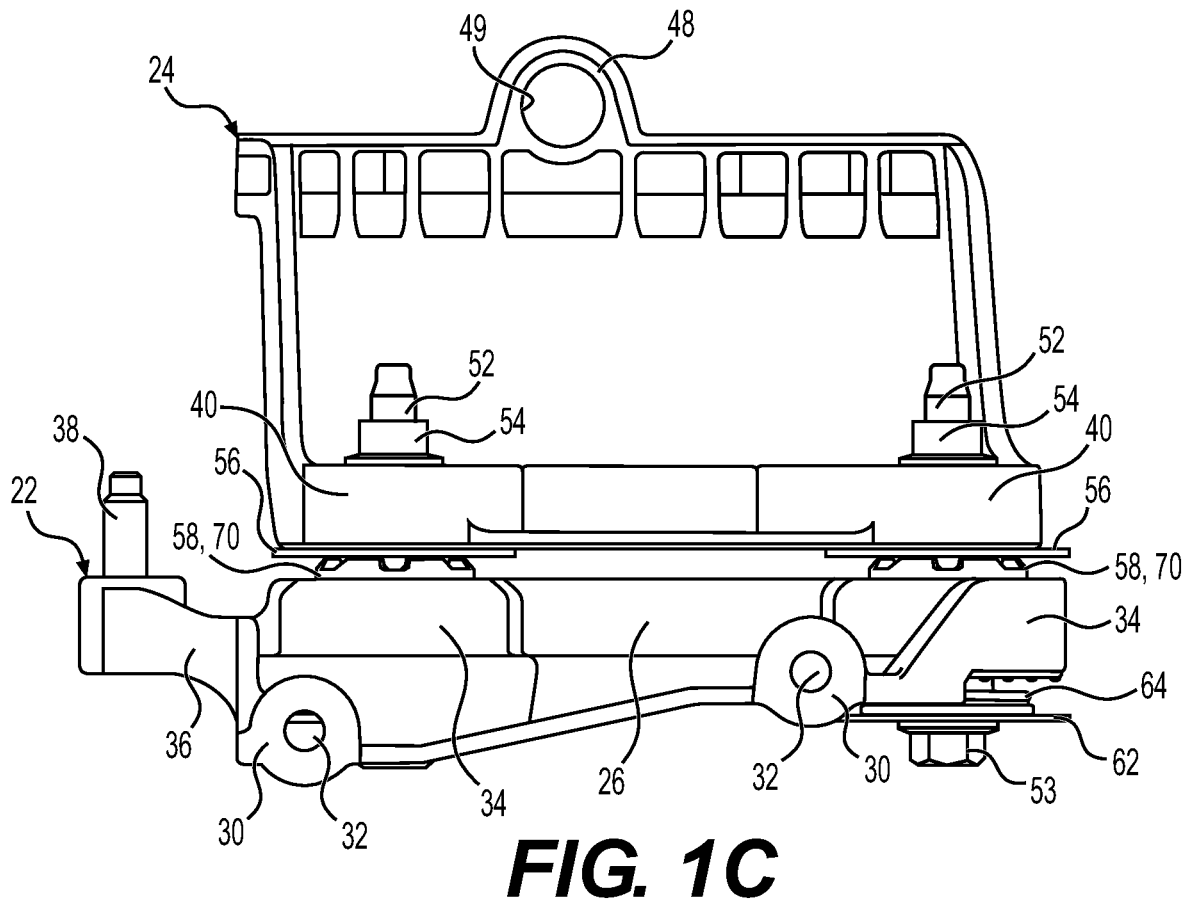
FIG. 1C shows a side view of the mounting bracket assembly of FIG. 1A.

FIGS. 1A-1C show several views of a mounting bracket assembly 20 of the present disclosure. The mounting bracket assembly 20 may be used to attach a component, such as a compressor to a larger structure, such as a chassis of a vehicle, and to limit transfer of vibration therebetween. The mounting bracket assembly 20 of the present disclosure may reduce noise, vibration, and harshness (NVH) that may otherwise be generated as a result of vibrations from the compressor being transmitted to other structures of the vehicle.

As shown in FIG. 1A, the mounting bracket assembly 20 includes a first structure 22 connected to a second structure 24. Each of the first structure 22 and the second structure 24 are shown as brackets. However, either or both of the structures 22, 24, may be another type of structural element, such as a housing of a motor or a compressor and/or a structural member of a larger assembly, such as a motor vehicle. A set of vibration isolating dampers 50 couple the first structure 22 to the second structure 24. The mounting bracket assembly 20 includes two of the vibration isolating dampers 50. However, an alternative mounting bracket may include any number of the vibration isolating dampers 50. For example, a mounting bracket may include only one of the vibration isolating damper. The number and configuration of the vibration isolating dampers 50 may depend on several design considerations, such as the weight and positioning of an object to be mounted thereto.

The first structure 22, which may also be called a lower bracket, may be formed of a rigid material, such as aluminum or steel and which may be molded, cast, and/or machined. In one embodiment, the first structure 22 may be formed in a high-pressure die cast (HPDC) process. However, other materials may be used, such as a fiber-reinforced polymer (FRP). The first structure 22 includes a body portion 26 with two mounting lugs 28 extending therefrom. The mounting lugs 28 each have a generally tubular shape and are spaced-apart and substantially parallel to one another. Each of the mounting lugs 28 defines a mounting flange 30 facing away from the body portion 26, with a mounting hole 32 defined therein and coaxial with the tubular shape. The mounting holes 32 may have an internal thread for receiving a bolt or other fastener (not shown) for mounting an object (not shown). The first structure 22 also defines two damper cups 34, with each of the damper cups 34 configured to hold a corresponding one of the vibration isolating dampers 50. The damper cups 34 each have a generally tubular shape that are spaced apart and substantially parallel to one another. Each of the damper cups 34 extend substantially perpendicular to the mounting lugs 28.

The first structure 22 also includes an extension portion 36 that extends from an end of the body portion 26, with a stud 38 attached thereto and extending substantially parallel to and spaced apart from the damper cups 34. The stud 34 may be used to attach other equipment, such as a wiring harness and/or an air duct.

The second structure 24, which may also be called an upper bracket, has a Z-shaped cross-section, best shown in FIG. 1B. The second structure 24 may be formed of a rigid material, such as plastic, which may include a fiber-reinforced polymer (FRP). However, the second structure 24 may be made of metal, such as aluminum. The second structure 24 defines a lower flange portion 40 configured to attach to the vibration isolating dampers 50. The lower flange portion 40 includes reinforced sections adjacent to the vibration isolating dampers 50 to withstand forces applied thereto from the vibration isolating dampers 50. The second structure 24 also includes a vertical portion 42 attached to the lower flange portion 40 and extending generally perpendicularly thereto and away from the first structure 22. The second structure 24 also includes an upper flange portion 44 attached to the vertical portion 42 opposite from the lower flange portion 40. Together, the lower flange portion 40, the vertical portion 42, and the upper flange portion 44, define the Z-shaped cross-section of the second structure 24. Alternative arrangements for the second structure 24 may be provided, such as ones with a C-shape or an L-shape cross-section.

The upper flange portion 44 defines a pair of mounting holes 46 extending therethrough in a spaced and substantially parallel configuration. The mounting holes 46 may include rigid inserts, such as metal sleeves, to receive corresponding bolts or screws (not shown) for securing the upper flange portion 44 to a structural element, such as a chassis of a vehicle. The upper flange 44 of the second structure 24 also includes an archway 48 defining a hole 49 extending therethrough. The archway 48 may function as a lifting lug for receiving a hook to lift the mounting bracket assembly 20 and any equipment attached thereto. The archway may be used during a vehicle assembly process for positioning the mounting bracket assembly 20 and corresponding equipment within a vehicle assembly prior to securement, such as before bolts are secured through the mounting holes 46.

The lower flange portion 40 of the second structure 24 may also include similar rigid inserts, such as metal sleeves, each configured to receive a fastener 52, such as a bolt or screw, of a corresponding vibration isolating dampers 50. A nut 54 is threaded on each of the fasteners 52 of the vibration isolating dampers 50 for securement to the lower flange portion 40 of the second structure 24. The fasteners 52 may be made of steel and may be, for example, a class 8.8 bolt. The fasteners 52 may include an M8 thread. However, the fasteners 52 may have a different materials, classification, and/or size.

Each of the vibration isolating dampers 50 includes a fastener 52 that extends through an assembly of another component, holding them together and securing the first structure 22 connected to the second structure 24 of the mounting bracket assembly 20. Each of the vibration isolating dampers 50 also includes an upper retainer washer 56, a primary isolator 58, an isolator ring 60, and a lower retainer washer 62. The upper retainer washer 56 and the lower retainer washer 62 may have an identical construction and may, therefore, be interchangeable. However, an alternative design may use different components for the upper retainer washer 56 and the lower retainer washer 62. The primary isolator 58 may be made of an elastomeric material, such as rubber. The isolator ring 60 may be made of an elastomeric material, such as rubber. There materials are merely illustrative and not intended to be limiting.

Figure 2:
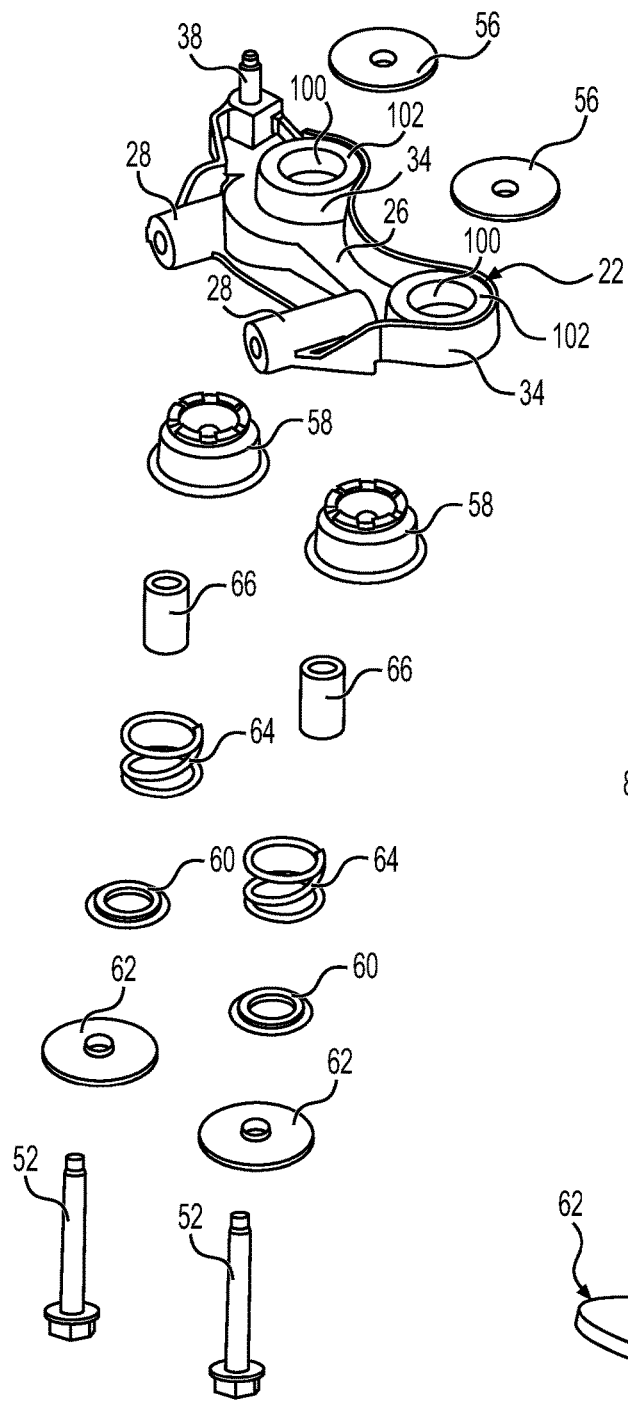
FIG. 2 shows an exploded diagram showing components of the vibration isolating damper in the mounting bracket assembly of FIG. 1A.
Figure 3:
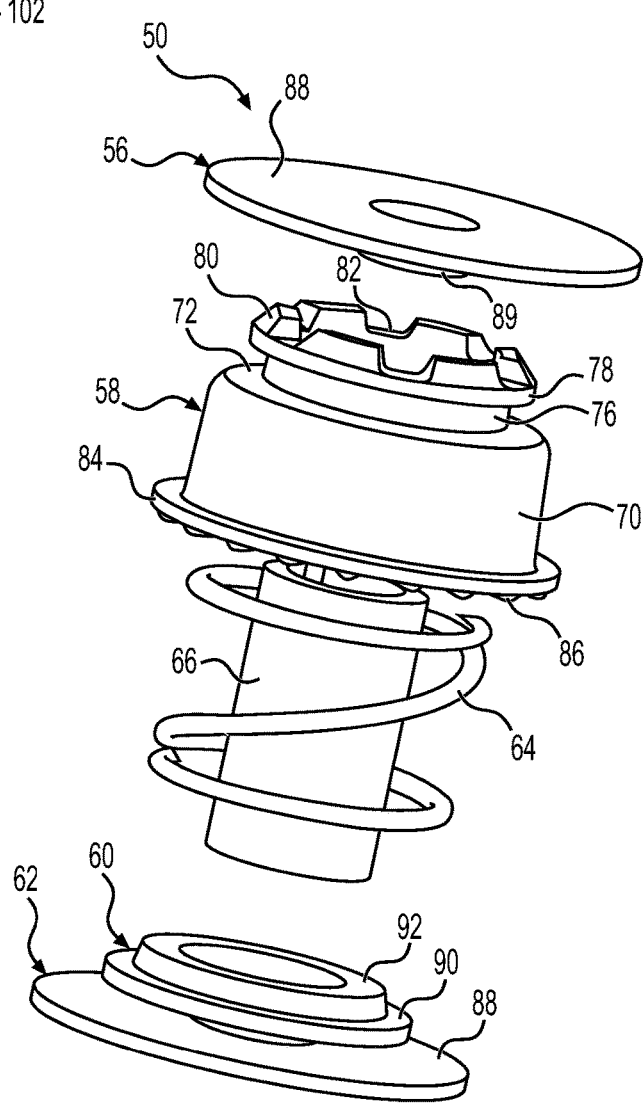
FIG. 3 shows exploded diagram showing components of the vibration isolating damper in accordance with an aspect of the present disclosure.

FIGS. 2-3 show various details of the vibration isolating dampers 50 and their attachment to the first structure 22. FIG. 2 shows the first structure 22 with each of the damper cups 34 defining a tubular wall 100 with an upper rim 102 to receive and engage a corresponding one of the vibration isolating dampers 50.

The primary isolator 58 includes a tubular body 70 that receives and surrounds a coil spring 64 and a rigid tube 66. The tubular body 70 may have a taper or a frustoconical shape, which may aid in installing the primary isolator 70 within the tubular wall 100 of the first structure 22. The rigid tube 66 configured to receive the fastener 52 therethrough, with the coil spring 64 wound thereabout. The rigid tube 66 may be made of steel or another rigid and durable material. The primary isolator 58 includes a shoulder 72 adjacent to an upper axial end thereof and having an annular shape that extends radially inwardly to partially close the upper axial end thereof, proximate to the upper retainer washer 56.

In some embodiments, the coil spring 64 is coated with a resilient material configured to generate a specific damping characteristic at a given range of frequencies. For example, the composition and/or characteristics such as thickness of the resilient material may be configured to cause the vibration isolating damper to have a dynamic transfer stiffness below a given value for the given range of frequencies. In some embodiments, the resilient material includes polyvinyl chloride (PVC). However, other materials may be used for coating the coil spring.

Still referring to FIG. 3, the primary isolator 58 also includes a tubular extension 76 that extends axially upwardly from the shoulder 72, away from the tubular body 70. The primary isolator 58 also includes an annular extension 78 that extends radially outwardly from the tubular extension 76 at an end thereof spaced apart from the shoulder 72. The annular extension 78 best shown in FIG. 3 with a solid ring shape. However, the annular extension 78 may have a different configuration, such as an annular arrangement of several different sections. Together, the shoulder 72, the tubular extension 76, and the annular extension 78 define an annular pocket that receives a corresponding upper rim 102 of the first structure 22. A bumper extension 80 having a trapezoidal cross section extends upwardly from the annular extension 78 for engaging the upper retainer washer 56 and for damping any vibration therebetween. A plurality of upper recesses 82 are defined in the bumper extension 80 at regular angular intervals to provide a castellated structure. The bumper extension 80 may function as an end-of-travel feature to engage the upper retainer washer 56 to limit travel between the first structure 22 and the second structure 24 in a compression direction with the first structure 22 and the second structure 24 coming together, i.e. when the vibration isolating damper 50 is in a full-extended position.

The primary isolator 58 also includes a lower skirt 84 that extends annularly about and radially outwardly from a lower end of the tubular body 70 opposite from the shoulder 72. A plurality of protrusions 86 extending from a lower surface of the lower skirt 84, away from the shoulder 72. The protrusions 86 may function as an end-of-travel feature to engage the lower retainer washer 62 to limit travel between the first structure 22 and the second structure 24 in a tension direction with the first structure 22 and the second structure 24 pulling apart, i.e. when the vibration isolating damper 50 is in a full-compressed position.

FIG. 3 also shows each of the upper retainer washer 56 and the lower retainer washer 62 including a flat plate 88 with a circular shape and a central hole for the fastener 52 to pass through. Each of the upper retainer washer 56 and the lower retainer washer 62 also include a locating feature 89 adjacent to the central hole and which extends substantially perpendicularly to the flat plate 88 to engage the rigid tube 66 therebetween. In some embodiments, the locating feature 89 of each of the upper retainer washer 56 and the lower retainer washer 62 may include a tubular-shaped protrusion that may be press-fit into a central bore of the rigid tube 66. However, the locating feature 89 of either or both of the upper retainer washer 56 and/or the lower retainer washer 62 may have a different configuration.

FIG. 3 also shows the isolator ring 60, which includes a flange portion 90 that is disposed adjacent to the lower retainer washer 62. The isolator ring 60 also includes a narrowed portion 92 protruding upward from the flange portion 90 and having a shared central bore configured to tightly surround the rigid tube 66 adjacent to the lower retainer washer 62. The isolator ring 60 may engage the coil spring 64, with the flange portion 90 extending between the coil spring 64 and the flat plate 88 of the lower retainer washer 62. The narrowed portion 92 is configured to fit within the coil spring, with an end of the coil spring 64 disposed around the narrowed portion 92 to locate the coil spring 64 coaxial with and spaced apart from the rigid tube 66.

Figure 4:
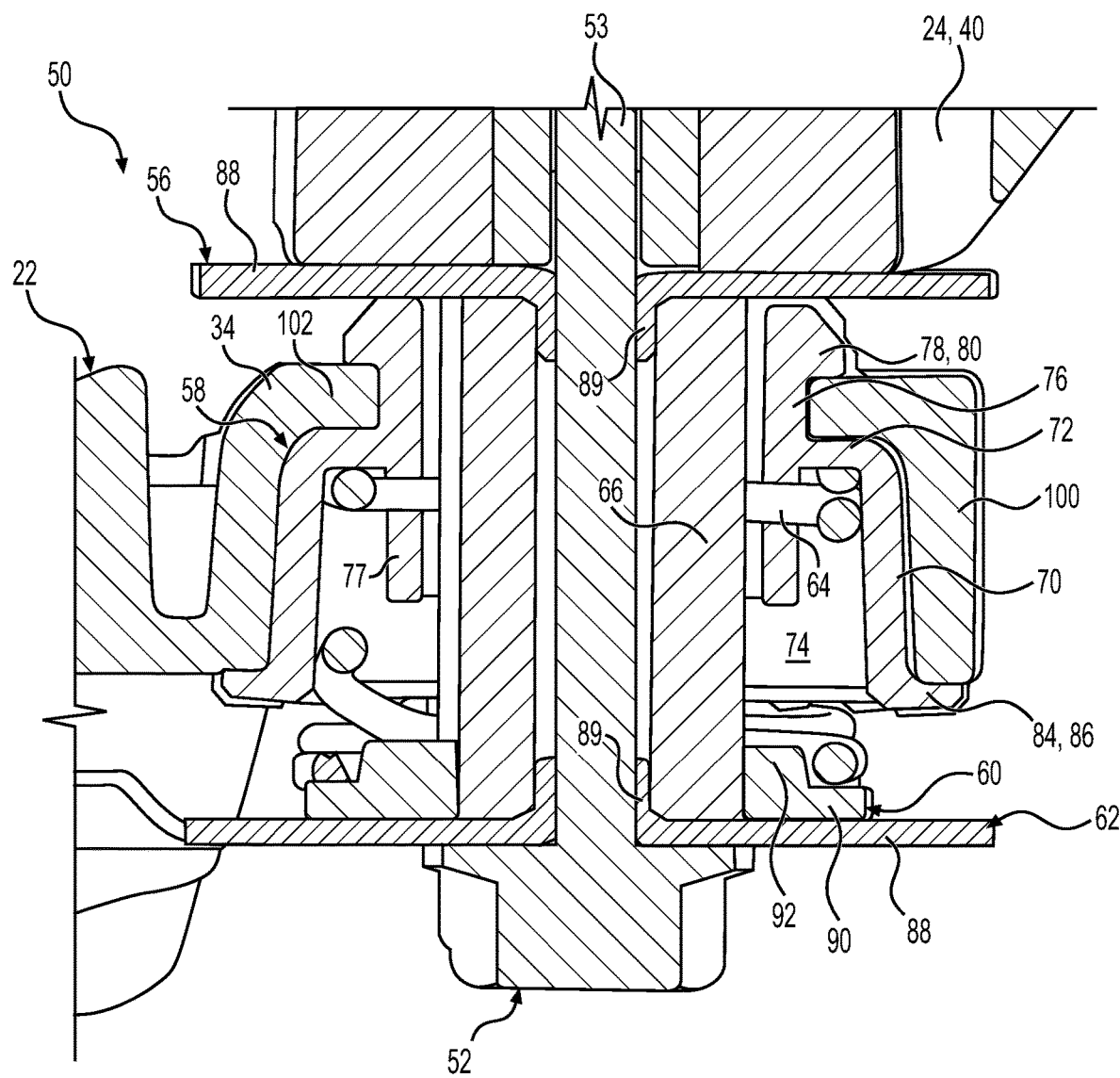
FIG. 4 is fragmentary cut-away diagram showing internal details of the vibration isolating damper in the mounting bracket assembly of FIG. 1A.

FIG. 4 is fragmentary cut-away diagram showing internal details of the vibration isolating damper 50 and its attachment to the first structure 22 and the second structure 24. FIG. 4 shows the fastener 52 in the form of a bolt, with a head contacting a lower surface of the lower retainer washer 62, opposite the locating feature 89. The fastener 52 also includes a rod portion 53 that extends through a center of the lower retainer washer 62, the rigid tube 66, the upper retainer washer 56, and the lower flange portion 40 of the second structure 24 for attachment thereto. As shown in FIG. 4, the primary isolator 58 also includes an inner tubular portion 77 that extends axially from the shoulder 72 and away from the annular extension 78, and located radially between the coil spring 64 and the rigid tube 66. The inner tubular portion 77, together with the shoulder 72 and the tubular body 70 define a pocket for receiving an upper end of the coil spring 64, opposite from the isolator ring. This pocket in the primary isolator 58 to locate the coil spring 64 coaxial with and spaced apart from the rigid tube 66.

Figure 5:
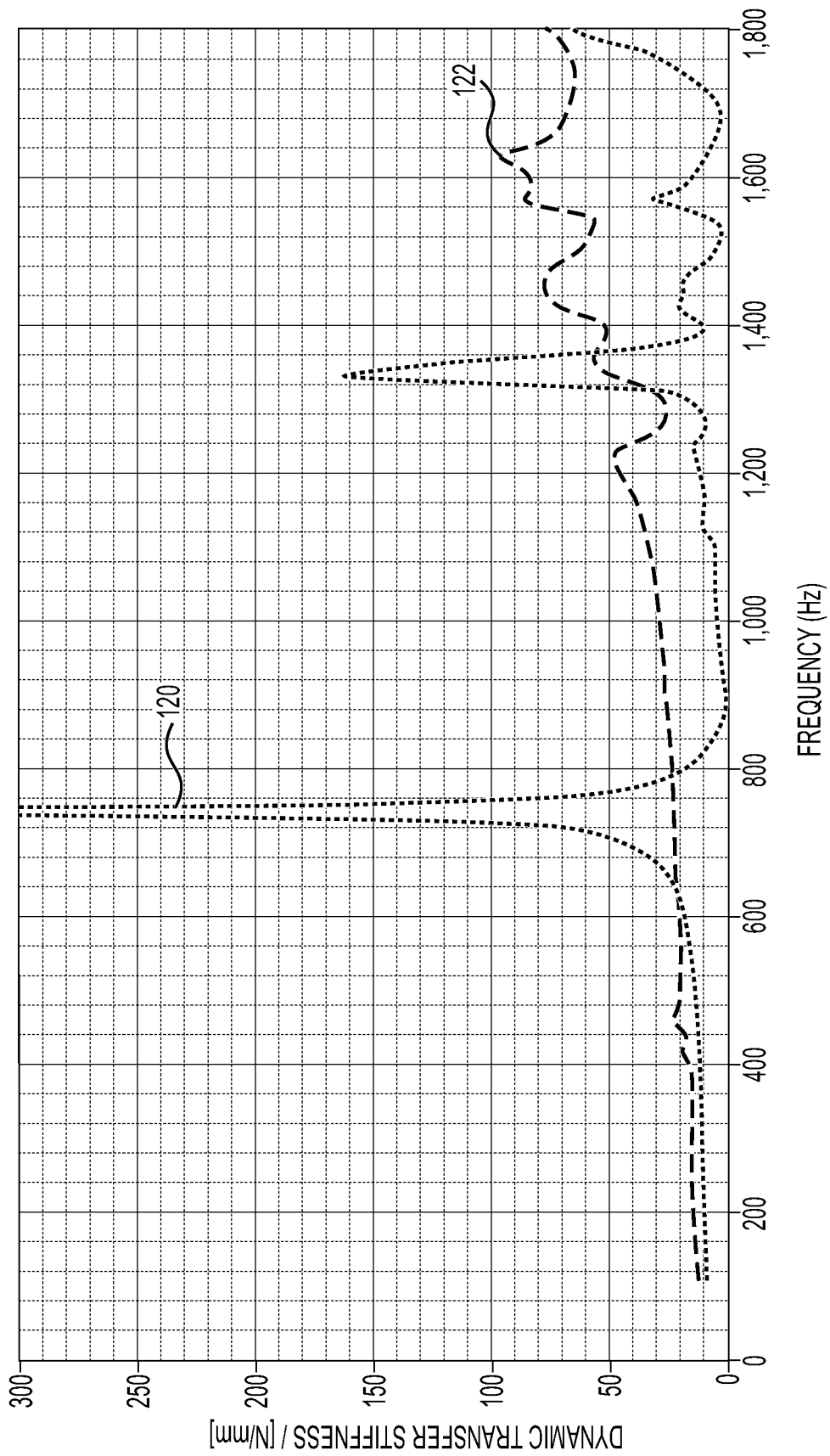
FIG. 5 shows a graph with plots showing dynamic transfer stiffness as a function of frequency for the vibration isolating damper with an uncoated coil spring and with a PVC coated coil spring.

FIG. 5 shows a graph with plots 120, 122 showing dynamic transfer stiffness as a function of frequency for the vibration isolating damper 50 of the present disclosure. A first plot 120 shows the dynamic transfer stiffness of the vibration isolating damper 50 with the coil spring 64 being uncoated. A second plot 122 shows the dynamic transfer stiffness of the vibration isolating damper 50 with the coil spring 64 having a PVC coating. As shown, the first plot 120 has a large peak in dynamic stiffness at around 700 Hz, and a smaller peak at around 1,300 Hz. The second plot 122 shows the dynamic transfer stiffness for the coil spring 64 with the PVC coating and which does not include any large peaks in dynamic stiffness. However, the dynamic transfer stiffness of the vibration isolating damper 50 with the PVC-coated coil spring 64 with the PVC coating has a generally higher transfer stiffness, especially at frequencies greater than about 800 Hz.

According to an aspect of the present disclosure, a vibration isolating damper for securing a first structure to a second structure is provided. The vibration isolating damper includes: a primary isolator of elastomeric material configured to engage the first structure for securement thereto and including a tubular body and a shoulder adjacent to an axial end of the tubular body, the shoulder extending radially inwardly to partially close the axial end of the tubular body a fastener having a rod portion extending through the tubular body of the primary isolator and configured for securement to the second structure; a rigid tube disposed about the rod portion of the fastener and extending through the tubular body of the primary isolator; and a coil spring disposed about the rigid tube and engaging the shoulder of the primary isolator within the tubular body.

In some embodiments, the coil spring is coated with a resilient material configured to generate a specific damping characteristic at a given range of frequencies.

In some embodiments, the resilient material includes polyvinyl chloride (PVC).

In some embodiments, the vibration isolating damper further includes at least one retainer washer having a flat plate defining a hole for the fastener to pass through, the at least one retainer washer further including a locating feature adjacent to the hole and configured to engage the rigid tube.

In some embodiments, the at least one retainer washer includes two retainer washers, each configured to engage an opposite end of the rigid tube.

In some embodiments, the locating feature includes a tubular-shaped protrusion configured to press-fit into a central bore of the rigid tube for securement thereto.

In some embodiments, the vibration isolating damper further includes an isolator ring of elastomeric material configured to engage the coil spring, with the coil spring extending between the isolator ring and the shoulder of the primary isolator.

In some embodiments, the isolator ring defines a narrowed portion configured to fit within the coil spring, with an end of the coil spring disposed around the narrowed portion to locate the coil spring coaxial with and spaced apart from the rigid tube.

In some embodiments, the primary isolator further includes a bumper extension located beyond the shoulder away from the tubular body and configured to limit travel between the first structure and the second structure in a compressive direction.

In some embodiments, the primary isolator further includes a tubular extension that extends beyond the shoulder away from the tubular body, and an annular extension that extends radially outwardly from an end of the tubular extension spaced apart from the shoulder, and the shoulder, the tubular extension, and the annular extension together define an annular pocket that receives a corresponding rim of the first structure for securement thereto.

In some embodiments, the primary isolator further includes a lower skirt that extends annularly about and radially outwardly from a lower end of the tubular body opposite from the shoulder.

In some embodiments, the primary isolator further includes plurality of protrusions extending from a lower surface of the lower skirt, away from the shoulder and configured to limit travel between the first structure and the second structure in a tension direction.

According to an aspect of the present disclosure, mounting bracket assembly for attaching a component to a structural element in a vehicle provided. The mounting bracket assembly damper includes at least one vibration isolating damper configured to couple the component to the structural element while limiting transmission of vibration therebetween. The at least one vibration isolating damper includes: a primary isolator of elastomeric material configured to engage a first structure for securement thereto and including a tubular body and a shoulder adjacent to an axial end of the tubular body, the shoulder extending radially inwardly to partially close the axial end of the tubular body; a fastener having a rod portion extending through the tubular body of the primary isolator and configured for securement to a second structure; a rigid tube disposed about the rod portion of the fastener and extending through the tubular body of the primary isolator; and a coil spring disposed about the rigid tube and engaging the shoulder of the primary isolator within the tubular body.

In some embodiments, the at least one vibration isolating damper includes two vibration isolating dampers.

In some embodiments, the coil spring is coated with a resilient material configured to generate a specific damping characteristic at a given range of frequencies.

In some embodiments, the resilient material includes polyvinyl chloride (PVC).

In some embodiments, the mounting bracket further comprises an isolator ring of elastomeric material configured to engage the coil spring, with the coil spring extending between the isolator ring and the shoulder of the primary isolator.

In some embodiments, the isolator ring defines a narrowed portion configured to fit within the coil spring, with an end of the coil spring disposed around the narrowed portion to locate the coil spring coaxial with and spaced apart from the rigid tube.

In some embodiments, the primary isolator further includes a bumper extension located beyond the shoulder away from the tubular body and configured to limit travel between the first structure and the second structure in a compressive direction.

In some embodiments, the primary isolator further includes a tubular extension that extends beyond the shoulder away from the tubular body, and an annular extension that extends radially outwardly from an end of the tubular extension spaced apart from the shoulder, and the shoulder, the tubular extension, and the annular extension together define an annular pocket that receives a corresponding rim of the first structure for securement thereto.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A vibration isolating damper for securing a first structure to a second structure, and comprising:
   a primary isolator of elastomeric material configured to engage the first structure for securement thereto and including a tubular body and a shoulder adjacent to an axial end of the tubular body, the shoulder extending radially inwardly to partially close the axial end of the tubular body, wherein the primary isolator further includes a lower skirt that extends annularly about and radially outwardly from a lower end of the tubular body opposite from the shoulder, and wherein the primary isolator further includes plurality of protrusions extending from a lower surface of the lower skirt, away from the shoulder and configured to limit travel between the first structure and the second structure in a tension direction;
   a fastener having a rod portion extending through the tubular body of the primary isolator and configured for securement to the second structure;
   a rigid tube disposed about the rod portion of the fastener and extending through the tubular body of the primary isolator; and
   a coil spring disposed about the rigid tube and engaging the shoulder of the primary isolator within the tubular body.

2. The vibration isolating damper of claim 1, wherein the coil spring is coated with a resilient material configured to generate a specific damping characteristic at a given range of frequencies.

3. The vibration isolating damper of claim 2, wherein the resilient material includes polyvinyl chloride (PVC).

4. The vibration isolating damper of claim 1, further comprising at least one retainer washer having a flat plate defining a hole for the fastener to pass through, the at least one retainer washer further including a locating feature adjacent to the hole and configured to engage the rigid tube.

5. The vibration isolating damper of claim 4, wherein the at least one retainer washer includes two retainer washers, each configured to engage an opposite end of the rigid tube.

6. The vibration isolating damper of claim 4, wherein the locating feature includes a tubular-shaped protrusion configured to press-fit into a central bore of the rigid tube for securement thereto.

7. The vibration isolating damper of claim 1, further comprising an isolator ring of elastomeric material configured to engage the coil spring, with the coil spring extending between the isolator ring and the shoulder of the primary isolator.

8. The vibration isolating damper of claim 7, wherein the isolator ring defines a narrowed portion configured to fit within the coil spring, with an end of the coil spring disposed around the narrowed portion to locate the coil spring coaxial with and spaced apart from the rigid tube.

9. The vibration isolating damper of claim 1, wherein the primary isolator further includes a bumper extension located beyond the shoulder away from the tubular body and configured to limit travel between the first structure and the second structure in a compressive direction.

10. The vibration isolating damper of claim 1, wherein the primary isolator further includes a tubular extension that extends beyond the shoulder away from the tubular body, and an annular extension that extends radially outwardly from an end of the tubular extension spaced apart from the shoulder, and
 wherein the shoulder, the tubular extension, and the annular extension together define an annular pocket that receives a corresponding rim of the first structure for securement thereto.

11. A mounting bracket assembly for attaching a component to a structural element in a vehicle, comprising:
 at least one of the vibration isolating damper of claim 1.

12. The mounting bracket assembly of claim 11, wherein the at one of the vibration isolating damper of claim 1 includes two of the vibration isolating dampers of claim 1.

13. The vibration isolating damper of claim 1, wherein the primary isolator further includes: a tubular extension that extends beyond the shoulder away from the tubular body, an annular extension that extends radially outwardly from an end of the tubular extension spaced apart from the shoulder, and a bumper extension extending from the annular extension away from the tubular body, and
 wherein the bumper extension defines a plurality of upper recesses at regular angular intervals.

14. The vibration isolating damper of claim 1, wherein the primary isolator further includes an inner tubular portion extending in an axial direction from the shoulder and located between the coil spring and the rigid tube, and
 wherein the inner tubular portion, the shoulder, and the tubular together define a pocket that receives an upper end of the coil spring.

15. A vibration isolating damper for securing a first structure to a second structure, and comprising:
 a primary isolator of elastomeric material configured to engage the first structure for securement thereto and including a tubular body and a shoulder adjacent to an axial end of the tubular body, the shoulder extending radially inwardly to partially close the axial end of the tubular body;
 a fastener having a rod portion extending through the tubular body of the primary isolator and configured for securement to the second structure;
 a rigid tube disposed about the rod portion of the fastener and extending through the tubular body of the primary isolator; and
 a coil spring disposed about the rigid tube and engaging the shoulder of the primary isolator within the tubular body,
 wherein the primary isolator further includes: a tubular extension that extends beyond the shoulder away from the tubular body, an annular extension that extends radially outwardly from an end of the tubular extension spaced apart from the shoulder, and a bumper extension extending from the annular extension away from the tubular body, and
 wherein the bumper extension defines a plurality of upper recesses at regular angular intervals.

16. The vibration isolating damper of claim 15, wherein the bumper extension has a trapezoidal cross section.

17. The vibration isolating damper of claim 15, wherein the primary isolator further includes a lower skirt that extends annularly about and radially outwardly from a lower end of the tubular body opposite from the shoulder, and
 wherein the primary isolator further includes plurality of protrusions extending from a lower surface of the lower skirt, away from the shoulder and configured to limit travel between the first structure and the second structure in a tension direction.

18. A vibration isolating damper for securing a first structure to a second structure, and comprising:
 a primary isolator of elastomeric material configured to engage the first structure for securement thereto and including a tubular body and a shoulder adjacent to an axial end of the tubular body, the shoulder extending radially inwardly to partially close the axial end of the tubular body,
 a fastener having a rod portion extending through the tubular body of the primary isolator and configured for securement to the second structure;
 a rigid tube disposed about the rod portion of the fastener and extending through the tubular body of the primary isolator; and
 a coil spring disposed about the rigid tube and engaging the shoulder of the primary isolator within the tubular body,
 wherein the primary isolator further includes an inner tubular portion extending in an axial direction from the shoulder and located between the coil spring and the rigid tube, and
 wherein the inner tubular portion, the shoulder, and the tubular together define a pocket that receives an upper end of the coil spring.

19. The vibration isolating damper of claim 18, wherein the primary isolator further includes: a tubular extension that extends beyond the shoulder away from the tubular body, an annular extension that extends radially outwardly from an end of the tubular extension spaced apart from the shoulder, and a bumper extension extending from the annular extension away from the tubular body, and
 wherein the bumper extension defines a plurality of upper recesses at regular angular intervals.

20. The vibration isolating damper of claim 18, wherein the primary isolator further includes a lower skirt that extends annularly about and radially outwardly from a lower end of the tubular body opposite from the shoulder, and
 wherein the primary isolator further includes plurality of protrusions extending from a lower surface of the lower skirt, away from the shoulder and configured to limit travel between the first structure and the second structure in a tension direction.

* * * * *